United States Patent [19]

Oki et al.

[11] 3,926,702
[45] Dec. 16, 1975

[54] CERAMIC STRUCTURES AND PROCESS FOR PRODUCING THE SAME

[75] Inventors: Masami Oki, Nagoya; Ryuzo Hori, Toyota; Naoto Miwa, Kariya, all of Japan

[73] Assignee: Asamura Patent Office, Japan

[22] Filed: Mar. 27, 1973

[21] Appl. No.: 345,456

[30] Foreign Application Priority Data
Mar. 29, 1972 Japan .............................. 47-32039
Mar. 29, 1972 Japan .............................. 47-32041

[52] U.S. Cl. ............. 156/89; 23/288 F; 156/245; 156/280; 156/292; 252/477 R; 264/58; 264/59; 264/60; 427/226; 427/230; 427/243; 428/178; 428/186; 428/188; 428/218; 428/305

[51] Int. Cl.² ............. C04B 37/00; C04B 39/12; C04B 41/06; B32B 3/12

[58] Field of Search ............ 252/477 R; 23/288 F; 264/58, 60, 59, 62; 156/89, 325, 245, 280, 292; 161/68, 135, 136, 137; 117/98; 428/178, 186, 188, 218, 305; 427/226, 230, 243, 419

[56] References Cited
UNITED STATES PATENTS

| 2,977,265 | 3/1961 | Forsberg | 156/197 |
|---|---|---|---|
| 3,088,271 | 5/1963 | Smith | 23/288 F |
| 3,112,184 | 11/1963 | Hollenbach | 156/197 |
| 3,251,403 | 5/1966 | Smith | 156/89 |
| 3,272,686 | 9/1966 | Smith et al. | 156/89 |
| 3,502,596 | 3/1970 | Sowards | 264/60 |
| 3,597,165 | 8/1971 | Keith et al. | 252/477 R |

*Primary Examiner*—George F. Lesmes
*Assistant Examiner*—Charles E. Lipsey
*Attorney, Agent, or Firm*—Cushman, Darby & Cushman

[57] ABSTRACT

A ceramic structure excellent in resistance to mechanical and thermal impacts can be obtained according to a process comprising a first step in which optional-shaped substrates composed of a ceramic material are subjected to primary firing, a second step in which the said substrates are coated with a substance capable of being made porous by secondary firing, a third step in which the said substrates are laminated each other so as to form fluid passages between the substrates, and a fourth step in which the laminated substrates are subjected to secondary firing to be chemically bonded to form a unit structure by means of the said substance capable of being made porous, thereby uniformly coating the said unit structure with the said substance which has been made porous.

Further, the thus obtained structure is immersed in, for example, an alumina type ceramic solution and then subjected to tertiary firing to adhere the alumina type ceramic to the pores and surface of the ceramic layer on the said structure, whereby an inexpensive ceramic structure can be produced.

6 Claims, 5 Drawing Figures

CERAMIC STRUCTURES AND PROCESS FOR PRODUCING THE SAME

BACKGROUND OF THE INVENTION

This invention relates to a ceramic structure to be used in, for example, waste gas purification means for automobiles, and to a process for producing said structure.

A conventional ceramic structure has been produced according to a process carried out, for example, in such a manner that substrates composed of cordierite or mullite subjected in primary firing are laminated to each other so as to form between the substrates fluid passages through which waste gases, air, etc. are passed, and the laminated substrates are subjected to a second firing to form a ceramic structure, which is then coated with a substance having a large specific surface area such as, for example, γ-alumina ($\gamma$-$Al_2O_3$) or the like, thereby increasing the specific surface area of the ceramic structure. According to said process, however, there have been such drawbacks that the uniform coating of the said substrates with the substance having a large specific surface area is difficult, and if the substance having a large specific surface area is coated thickly, and if a mechanical or thermal impact of, for example, about 30G (G: 9.8 m/sec$^2$) is applied to the said ceramic structure, the layers comprising the substance having a large specific surface area comes off from the said substrates.

With an aim to overcome the above-mentioned drawbacks, the present inventors made extensive studies to accomplish the present invention.

An object of the present invention is to provide a process for producing a ceramic structure coated uniformly with a porous substance and excellent in resistance to mechanical and thermal impacts which comprises a first step in which optional-shaped substrates composed of a ceramic material are subjected to primary firing, a second step in which the said substrates are coated with a substance capable of being made porous by secondary firing, a third step in which the said substrates are laminated to each other so as to form fluid passages between the substrates, and a fourth step in which the laminated substrates are subjected to secondary firing to chemically bond the said substrates to form a unit structure by means of the said substance capable of being made porous.

Another object of the invention is to provide a ceramic structure excellent in resistance to mechanical and thermal impacts which comprises substrates composed of a ceramic material and porous ceramic layers formed on the substrates, the pores of said ceramic layers having been filled with an alumina type ceramic having a large specific surface area.

A further object of the invention is to provide a process for producing an inexpensive ceramic structure which comprises a first step in which a ceramic material is shaped into flat and wavy substrates, a second step in which the flat and wavy substrates are immersed in a mixed slurry comprising an organic material and a ceramic material, a third step in which the immersed substrates are alternately laminated, a fourth step in which the resulting laminate is fired at a high temperature to prepare a construction, and a fifth step in which the said construction is immersed in an alumina type ceramic solution and then fired to firmly adhere the alumina type ceramic to the pores and surface of said construction, wherein the firing temperatures of the flat and wavy substrates and the mixed slurry are close to each other, so that two of the production steps can be reduced to one to make it possible to produce the inexpensive ceramic structure.

A still further object of the invention is to provide as a modification of the above-mentioned process, a process for producing a ceramic structure which comprises a step in which a ceramic material is shaped into flat and wavy substrates, a step in which the flat and wavy substrates are alternately laminated and then fired at a high temperature to prepare a construction, a step in which the construction is immersed in a mixed slurry comprising an organic material and a ceramic material, a step in which the immersed construction is fired, and a step in which the construction is immersed in an alumina type ceramic solution and then fired to firmly adhere the alumina type ceramic onto the surface of the said construction, wherein the production operations are easy and the ceramic structure as a final product is favorable in yield.

In the accompanying drawings.

The present invention is illustrated below with reference to the drawings.

Figure 1:
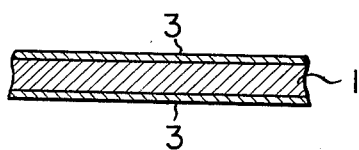
FIGS. 1 and 2 are longitudinal sections of the flat and wavy substrates coated with a substance capable of being made porous by a second firing which were obtained after completion of the second step of the first-mentioned process of the present invention.
Figure 2:
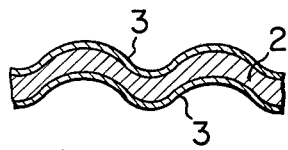
Figure 3:
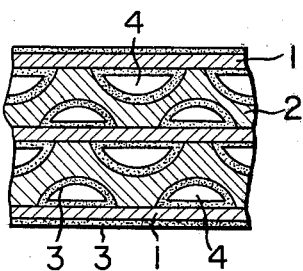
FIG. 3 is a longitudinal section of the ceramic structure obtained after completion of the fourth step of the above-mentioned process of the present invention.

The construction of the ceramic structure produced according to the first process of the present invention is as shown in FIG. 3, in which 1 is a flat substrate, 2 is a wavy substrate, 3 is a bonding layer composed of a substance capable of being made porous which firmly bonds the said flat and wavy substrates 1 and 2 to form a unit structure, and 4 shows fluid passages provided between the said flat substrate 1 and wavy substrate 2 through which waste gases, air, etc. are passed.

The present process for producing a ceramic structure of the above-mentioned construction is explained below.

First embodiment:

In the first step, a mixture comprising 3 kg of a glass ceramic powder, 500 g of phenol resin and 1 liter of alcohol is flowed into flat and wavy molds and then subjected to primary firing at 500° to 1,200°C, preferably 900°C, for 1 hour to obtain flat and wavy substrates 1 and 2. In the second step, each of the upper and lower sides of the above-mentioned flat and wavy substrates 1 and 2 is coated with a mixture comprising 3 kg of aluminum hydroxide, 100 g of phenol resin and 1 liter of alcohol to form a layer of 0.2 mm thickness. In the third step, the coated flat and wavy substrates 1 and 2 are dried at 220° to 230°C. to vaporize the alcohol, coated with a binding material comprising the above-mentioned glass ceramic powder-phenol resin-alcohol mixture, and then laminated to each other. In the fourth step, the laminated substrates 1 and 2 are subjected to a second firing at 500° to 1,600°C, preferably 900°C, for 5 hours, for example, whereby the alcohol is vaporized, the phenol resin is thermally carbonized and burned off, the aluminum hydroxide is thermally decomposed to a γ- or δ-alumina, and the aforesaid flat and wavy substrates 1 and 2 are chemically bonded to each other by means of a bonding layer composed of the γ- or δ-alumina, whereby a ceramic structure having excellent mechanical and thermal impact properties can be produced. The present inventors could obtain, for example, a ceramic structure having excellent resistance to such shock (mechanical impact) as an acceleration of 30G (G: 9.8 m/sec$^2$).

Alternatively, the glass ceramic powder-phenol resin-alcohol mixture, which has been used in the above to form the flat and wavy substrates 1 and 2, may be replaced by a mixture comprising 35 to 50% by weight of silicon resin and 50 to 65% by weight of cordierite; and aluminum hydroxide, which has been used to form on each substrate a layer of γ-alumina or the like substance capable of being made porous, may be replaced by aluminum sulfate or the like aluminum compound; the fluid passages 4 having semicircular holes, which have been formed by alternately laminating the flat and wavy substrates 1 and 2, may be replaced by fluid passages having hexagonal holes by alternately laminating trapezoid wavy substrates.

Ceramic structures produced according to the above-mentioned first embodiment of the present process are suitable for use as catalyst carriers, rotary regenerative heat exchangers, filters, etc.

According to the above-mentioned embodiment of the present invention, the ceramic structure is produced through the first step in which optional-shaped substrates composed of a ceramic material are subjected to primary firing, the second step in which the said substrates are coated with a substance capable of being made porous by secondary firing, the third step in which the coated substrates are laminated to each other so as to form fluid passages between the substrates, and the fourth step in which the laminated substrates are subjected to secondary firing to be chemically bonded to form a unit structure by means of the said substance capable of being made porous. Accordingly, there are attained such effects that the substance capable of being made porous can be uniformly coated on the ceramic structure and thus the ceramic structure can be markedly enhanced in resistance to mechanical and thermal impacts.

Examples of the ceramic material used for preparing the aforesaid substrates include oxides such as cordierite, alumina, beryllia, mullite, titanium oxide, zirconia, and crystal glass; nitrides such as silicon nitride and aluminum nitride; borides such as titanium boride; and carbides such as titanium carbide, silicon carbide and boron carbide.

Figure 4:
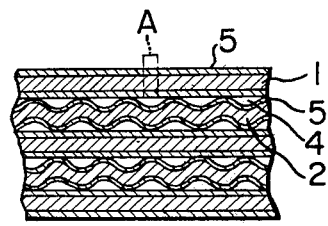
FIG. 4 is a longitudinal section of the ceramic structure obtained according to another process of the present invention.
Figure 5:
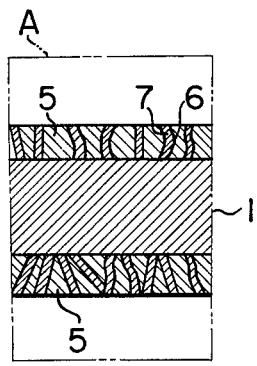
FIG. 5 is an enlarged longitudinal section of the portion A of the ceramic structure shown in FIG. 4.

Second embodiment:

The second embodiment of the present process is explained below with reference to FIGS. 4 and 5. In FIGS. 4 and 5, 1 and 2 are flat and wavy substrates composed of a ceramic material having excellent mechanical and thermal impact properties which have been alternately laminated to form a unit structure, the said ceramic being any oxide such as cordierite, alumina, beryllia, mullite, titanium oxide, zirconia and crystal glass, nitrides such as silicon nitride and aluminum nitride, borides such as titanium boride, etc., and carbides such as titanium carbide, silicon carbide and boron carbide; 5 is a porous ceramic layer composed of the same ceramic material as above which has been formed on the upper and lower sides of each of the said substrates 1 and 2; 6 shows numerous pores of the said ceramic layer 5; 7 is an alumina type ceramic having a large specific surface area such as γ- or δ-alumina which has been filled by firing into the said pores; and 4 shows many fluid passages through which various fluids such as waste gases or air are passed and which are positioned between the flat substrate 1 and the wavy substrate 2.

The ceramic structure explained above is produced by laminating the flat substrate 1 and the wavy substrate 2. In the present invention, it is also possible to produce a ceramic structure having hexagonal fluid passage portions 4 by laminating trapezoid wavy substrates.

Ceramic structures produced according to the above-mentioned second embodiment are suitable for use as catalyst carriers, rotary regenerative heat exchangers, filters, etc.

Procedures for producing the ceramic structure according to the above-mentioned second embodiment are explained below.

Procedure 1:

In the first step, a mixture comprising 3 kg of a ceramic material high in mechanical and thermal impact properties such as cordierite or alumina, 500 g of phenol resin and 1 liter of alcohol is flowed into flat and wavy molds and then subjected to primary firing at 1,000° to 1,600°C for 1 hour to prepare flat and wavy substrates 1 and 2. In the second step, each of the substrates 1 and 2 is immersed in a slurry comprising a 50:50 mixture of an organic material such as phenol resin, phenol furfural resin, furan resin, urea resin, melamine resin or epoxy resin and a ceramic material such as cordierite powder, and then subjected to firing at 1,100° to 1,600°C for 1 hour to form a porous ceramic layer 5 on each substrate. In the third step, the flat and wavy substrates each having the porous ceramic layer 5 are alternately laminated to form a laminate. In the fourth step, the laminate is subjected to firing at 1,200° to 1,300°C for 1 hour, whereby the organic material is burned off to form a porous ceramic layer 5 as well as to constitute a unit structure. In the fifth step, the said unit structure is immersed in an aqueous γ- or δ-alumina solution, dried and then subjected to firing at 700° to 1,000°C., preferably 800°C., whereby the γ- or δ-alumina 7 having a large specific surface area can be filled into the pores 6 of the aforesaid ceramic layer 5.

Procedure 2:

In the first step, flat and wavy substrates 1 and 2 are prepared in the same manner as in the above-mentioned procedure 1. In the second step, each of the substrates 1 and 2 is immersed in a slurry comprising a 50:50 mixture of an organic material and a ceramic material such as alumina powder. In the third step, the flat and wavy substrates 1 and 2 coated with the ceramic material are alternately laminated to form a laminate. In the fourth step, the laminate is subjected to secondary firing at 1,400° to 1,600°C for 1 hour, whereby the organic material is carbonized and burned off to form a porous ceramic layer 5 as well as to constitute a unit structure. In the fifth step, the said unit structure is immersed in a slurry prepared by mixing together aluminum hydroxide or the like aluminum compound, phenol resin and alcohol, dried and then subjected to tertiary firing at 700° to 1,000°C, preferably 800°C, for 30 minutes, whereby the phenol resin is carbonized and burned off, the alcohol is vaporized, and the aluminum hydroxide is thermally decomposed to form an alumina type ceramic 7 such as γ- or δ-alumina which can be filled into the pores of the aforesaid ceramic layer 5.

Procedure 3:

In the first step, flat and wavy substrates 1 and 2 are prepared in the same manner as in the aforesaid procedure 1. In the second step, the substrates 1 and 2 are alternately laminated, and the resulting laminate is subjected to secondary firing to prepare a unit structure. In the third step, the said unit structure is immersed in a slurry comprising a 50:50 mixture of an organic material and a ceramic material to coat the slurry on the surface of each of the substrates 1 and 2 constituting the unit structure. In the fourth step, the slurry-coated unit structure is subjected to tertiary firing at 1,100° to 1,600°C for 1 hour, whereby the orgnic material is carbonized and burned off to form a porous ceramic layer 5 on the surface of each of the substrates 1 and 2. In the fifth step, the unit structure having the aforesaid porous ceramic layer 5 is immersed in a slurry prepared by mixing together aluminum hydroxide or the like aluminum compound, phenol resin and alcohol. In the sixth step, the said unit structure is dried and then subjected to fourth firing at 800°C for 30 minutes, whereby the phenol resin is carbonized and burned off, the alcohol is vaporized, and the aluminum hydroxide is thermally decomposed to form an aluminum type ceramic 7 having a large specific surface area such as γ- or δ-alumina which can be filled in the pores 6 of the aforesaid ceramic layer 5.

According to the above-mentioned procedure 1, the ceramic structure is produced by forming porous ceramic layers on substrates composed of a ceramic material, and filling a substance having a large specific surface area into the pores of said ceramic layers. Accordingly, there are attained such excellent effects that the ceramic structure can be increased in resistance to mechanical and thermal impacts, and the substance having a large specific surface area does not come off from said substrates to make it possible to greatly enhance the durability of the ceramic structure.

According to procedure 2 of the second embodiment, the ceramic structure is produced through the step in which flat and wavy substrates are molded from a ceramic material, the step in which the said flat and wavy substrates are immersed in a mixed slurry composed of an organic material and a ceramic material, the step in which the immersed substrates are alternately laminated and the resulting laminate is fired at a high temperature to prepare a construction, and the step in which the said construction is immersed in an alumina type ceramic solution and then fired to firmly adhere the alumina type ceramic onto the surface of said construction. Since the firing temperature of the flat and wavy substrates and that of the mixed slurry are close to each other, there are attained such effects that two of the production steps can be reduced to one step, and an inexpensive ceramic structure can be produced.

According to procedure 3 of the second embodiment, the ceramic structure is produced through the step in which flat and wavy substrates are molded from a ceramic material, the step in which the said flat and wavy substrates are alternately laminated and the resulting laminate is fired at a high temperature to prepare a construction, the step in which the said construction is immersed in a mixed slurry composed of an organic material and a ceramic material, the step in which the immersed construction is fired, and the step in which the said construction is immersed in an alumina type ceramic solution and then fired to firmly adhere the alumina type ceramic onto the surface of said construction. Accordingly, there are attained such prominent effects that operations during the production steps are easy and a ceramic structure having excellent resistance to mechanical and thermal impacts can be obtained in a high yield.

What is claimed is:

1. A process for producing a ceramic structure which comprises forming in a first step optional-shaped substrates with a mixture of a ceramic material, an organic material and a solvent capable of dissolving said organic material and then firing said substrate; in a second step laminating said substrates to form a structure having fluid passages between said substrates; in a third step dipping said structure in a slurry consisting of the same ceramic material as the ceramic material in the first step, the organic material being present in a greater amount than that employed in the first step and a solvent capable of dissolving said organic material; in a fourth step firing said dipped structure to form a porous ceramic layer on the internal and external surfaces of said structure; in a fifth step dipping said structure having said porous ceramic layer in a liquid containing an aluminum compound which can be transformed to γ- or δ-$Al_2O_3$ by thermal decompostion to fill the pores in said layer with said aluminum compound and then firing said structure to thermally decompose said aluminum compound to γ- or δ-$Al_2O_3$. O 2. A process according to claim 1 in which said ceramic material is a powder containing predominantly ceramic materials selected from the group consisting of cordierite, alumina, mullite, beryllia, zircon, zirconia, titanium oxide, crystallized glass, silicon nitride, aluminum nitride, titanium boride, boron carbide and silicon carbide.

3. The process of claim 2 wherein the priming firing is effected at 500° to 1200°C.; and the secondary firing is effected at 500° to 1600°C.

4. The process of claim 2 wherein the primary firing is effected at 500° to 1200°C. and the secondary firing is effected at 500° to 1600°C.

5. A process for producing a ceramic structure which comprises forming in a first step optional-shaped substrates with a mixture of a ceramic material, an organic material and a solvent capable of dissolving said organic material and then firing said substrate; in a second step dipping said structure in a slurry consisting of the same ceramic material same as the ceramic material in the first step, the organic material being present in a greater amount than that employed in the first step and a solvent capable of dissolving said organic material; in a third step laminating said substrates to form a structure having fluid passages between said substrates; in a fourth step firing said dipped structure to form a porous ceramic layer on the internal and external surfaces of said structure; and in a fifth step dipping said structure having said porous ceramic layer in a liquid containing an aluminum compound which can be transformed to γ- or δ-$Al_2O_3$ by thermal decomposition to fill the pores in said layer with said aluminum compound and then firing said structure to thermally decompose said aluminum compound to γ- or δ-$Al_2O_3$.

6. A process according to claim 5 in which said ceramic material is a powder containing predominantly ceramic materials selected from the group consisting of cordierite, alumina, mullite, beryllia, zircon, zirconia, titanium dioxide, crystallized glass, silicon nitride, aluminum nitride, titanium boride, boron carbide, and silicon carbide.

* * * * *

UNITED STATES PATENT OFFICE
CERTIFICATE OF CORRECTION

Patent No. 3,926,702     Dated December 16, 1975

Inventor(s) Mesami Oki et al.

It is certified that error appears in the above-identified patent and that said Letters Patent are hereby corrected as shown below:

Delete "[73] Assignee: Asamura Patent Office, Japan"

and insert the following:

--[73] Assignee: Nippondenso Co., Ltd., Japan and Nippon Soken, Inc., Japan--

Signed and Sealed this twentieth Day of April 1976

[SEAL]

Attest:

RUTH C. MASON
*Attesting Officer*

C. MARSHALL DANN
*Commissioner of Patents and Trademarks*